(12) United States Patent
Haimerl et al.

(10) Patent No.: US 8,738,030 B2
(45) Date of Patent: May 27, 2014

(54) APPARATUS AND METHOD FOR DETERMINING A CORRESPONDENCE OF A POSITION WITH A REFERENCE POSITION

(75) Inventors: Stephan Haimerl, Seubersdorf (DE); Steffen Meyer, Erlangen (DE); Juergen Hupp, Nuremberg (DE)

(73) Assignee: Fraunhofer-Gesellschaft zur Foerderung der Angewandten Forschung E.V., Munich (DE)

( * ) Notice: Subject to any disclaimer, the term of this patent is extended or adjusted under 35 U.S.C. 154(b) by 176 days.

(21) Appl. No.: 13/479,697

(22) Filed: May 24, 2012

(65) Prior Publication Data

US 2012/0286999 A1    Nov. 15, 2012

Related U.S. Application Data

(63) Continuation of application No. PCT/EP2010/068228, filed on Nov. 25, 2010.

(30) Foreign Application Priority Data

Nov. 27, 2009   (DE) .......................... 10 2009 047 242

(51) Int. Cl.
*H04W 64/00* (2009.01)

(52) U.S. Cl.
USPC .......................... 455/456.1; 342/464; 370/252

(58) Field of Classification Search
CPC ......... H04W 48/16; G01S 5/021; H04L 47/10
USPC ......... 455/456.1, 436; 342/464, 466; 370/252
See application file for complete search history.

(56) References Cited

U.S. PATENT DOCUMENTS

| | | | |
|---|---|---|---|
| 2003/0210656 A1* | 11/2003 | Biacs et al. | 370/252 |
| 2005/0040968 A1 | 2/2005 | Damarla et al. | |
| 2007/0184850 A1 | 8/2007 | Hupp et al. | |
| 2009/0109095 A1 | 4/2009 | Hido et al. | |
| 2010/0278079 A1 | 11/2010 | Meyer et al. | |
| 2011/0153632 A1* | 6/2011 | Meyer et al. | 707/758 |

FOREIGN PATENT DOCUMENTS

| | | |
|---|---|---|
| DE | 10 2004 035 531 | 2/2006 |
| DE | 10 2008 036 681 | 7/2009 |

* cited by examiner

*Primary Examiner* — Phuoc H Doan
(74) *Attorney, Agent, or Firm* — Michael A. Glenn; Perkins Coie LLP

(57) ABSTRACT

An apparatus for determining a correspondence of a position with a reference position, wherein radio signals of stationary radio transmitters are receivable at the position, having a determiner for determining an identification of a certain radio transmitter and for determining a signal characteristic of a radio signal of the certain radio transmitter at a first time $t_1$, wherein the identification and the signal characteristic of the radio signal of the certain radio transmitter represent at least part of a measurement packet for the position, a processor for post-processing the measurement packet to obtain a post-processed measurement packet for the position wherein the processor for post-processing is implemented to synthesize the signal characteristic of the certain radio transmitter.

14 Claims, 9 Drawing Sheets

APPARATUS AND METHOD FOR DETERMINING A CORRESPONDENCE OF A POSITION WITH A REFERENCE POSITION

CROSS-REFERENCE TO RELATED APPLICATIONS

This application is a continuation of copending International Application No. PCT/EP2010/068228, filed Nov. 25, 2010, which is incorporated herein by reference in its entirety, and additionally claims priority from German Application No. DE 102009047242.8-55, filed Nov. 27, 2009, which is also incorporated herein by reference in its entirety.

BACKGROUND OF THE INVENTION

The present invention relates to apparatuses and methods for determining a correspondence of a position with a reference position as can be used in particular for localizing or navigating mobile terminal devices in a wireless communication network.

For localizing mobile terminal devices, different locating technologies are available. The probably most well-known system for localization or navigation outdoors is the satellite-aided global positioning system (GPS). For localization or navigation within buildings or indoors, different approaches are known, such as, for example, infrared systems, RFID systems or also field strength evaluations of IEE 802.11 WLAN networks (WLAN=wireless local area network). Currently, the GPS system is only reliably available for outdoors. Latest extensions, such as highly sensitive receivers or the so-called A-GPS (assisted GPS) represent attempts to make the technology also useable for within buildings. A-GPS combines the usage of the satellite-based GPS system with a reception of so-called assistance information from cellular mobile radio networks. However, currently, these technologies do not yet have the desired average accuracies. Infrared systems and RFID systems are not generally available with complete coverage and are bound to specific requirements.

Due to the increasing distribution of wireless radio networks based, for example, on the WLAN standard, these wireless networks offer themselves as the basis for new localization methods.

Common localization methods previously used are, for example, based on triangulation, neighborhood relationships, lateration by means of time measurement or lateration by means of field strength evaluation. These methods are localization methods where either a position of stationary radio transmitters of base stations has to be known, or where training has to be previously performed at reference positions in an environment to be covered by the localization method.

In WLAN based locating systems, frequently, so-called received signal strength (RSS) fingerprinting is used as a basic method. This method is based on the assumption that signal strengths of radio signals of several radio stations received or receivable at a current location uniquely characterize the current location or the current position. If a reference database exists, which includes, for a number of reference locations or reference positions, transmitter identifications of radio stations received or receivable there at reference times, as well as the signal strengths of the corresponding radio signals, the current position can be inferred from a set of current measurement values (transmitter identification and associated signal strength values) by matching between currently measured measurement values and the reference values of the database. This matching evaluates for every reference point how similar its previously recorded measurement values or reference values are to the current measurement values of the current positions. The most similar reference point(s) is/are then used as a basis for an estimated value for the current location of the mobile terminal device.

The signal strength of a radio transmitter receivable at a reference position at a reference measurement time is determined experimentally for a reference database by a reference measurement. This results in a database including, for every reference position where a reference measurement has been performed, a list of radio transmitters (access points) including the respective associated received field strength and quality. This list can also be referred to as reference packet. With a WLAN implementation, such a reference database can, for example, include the following parameters:

| RID | MAC | RSSI | PGS | X | Y | Z | MAPNR | CREATED |
|---|---|---|---|---|---|---|---|---|
| 1 | 00.0D.54.9E.17.81 | 46530 | 100 | 5795 | 15627 | 150 | 0 | 12.03.07 12:42 |
| 1 | 00.0D.54.9E.1A.BA | 67260 | 90 | 5795 | 15627 | 150 | 0 | 12.03.07 12:42 |
| 1 | 00.0D.54.9E.1D.64 | 72002 | 88 | 5795 | 15627 | 150 | 0 | 12.03.07 12:42 |
| 1 | 00.0E.6A.D3.B9.8B | 59531 | 100 | 5795 | 15627 | 150 | 0 | 12.03.07 12:42 |
| 1 | 00.0F.A3.10.07.6C | 46464 | 96 | 5795 | 15627 | 150 | 0 | 12.03.07 12:42 |
| 1 | 00.0F.A3.10.07.FB | 74488 | 94 | 5795 | 15627 | 150 | 0 | 12.03.07 12:42 |
| 1 | 00.0F.A3.10.09.SF | 72375 | 97 | 5795 | 15627 | 150 | 0 | 12.03.07 12:42 |
| 2 | 00.0D.54.9E.17.81 | 54138 | 100 | 14399 | 15451 | 150 | 0 | 12.03.07 12:43 |
| 2 | 00.0D.54.9E.18.1D | 76560 | 11 | 14399 | 15451 | 150 | 0 | 12.03.07 12:43 |
| 2 | 00.0D.54.9E.1A.BA | 62318 | 94 | 14399 | 15451 | 150 | 0 | 12.03.07 12:43 |
| 2 | 00.0D.54.9E.1D.64 | 71348 | 96 | 14399 | 15451 | 150 | 0 | 12.03.07 12:43 |
| 2 | 00.0E.6A.D3.B9.8B | 45393 | 100 | 14399 | 15451 | 150 | 0 | 12.03.07 12:43 |
| 2 | 00.0F.A3.10.07.6C | 66853 | 96 | 14399 | 15451 | 150 | 0 | 12.03.07 12:43 |

-continued

| RID | MAC | RSSI | PGS | X | Y | Z | MAPNR | CREATED |
|---|---|---|---|---|---|---|---|---|
| 2 | 00.0F.A3.10.07.FB | 72251 | 100 | 14399 | 15451 | 150 | 0 | 12.03.07 12:43 |
| 2 | 00.0F.A3.10.09.5F | 70990 | 90 | 14399 | 15451 | 150 | 0 | 12.03.07 12:43 |
| 3 | 00.0D.54.9E.17.81 | 58291 | 100 | 24583 | 15627 | 150 | 0 | 12.03.07 12:43 |
| 3 | 00.0D.54.9E.18.1D | 78610 | 68 | 24583 | 15627 | 150 | 0 | 12.03.07 12:43 |
| 3 | 00.0D.54.9E.1A.BA | 62153 | 98 | 24583 | 15627 | 150 | 0 | 12.03.07 12:43 |
| 3 | 00.0D.54.9E.1D.64 | 64187 | 90 | 24583 | 15627 | 150 | 0 | 12.03.07 12:43 |
| 3 | 00.0E.6A.D3.B9.8B | 32851 | 100 | 24583 | 15627 | 150 | 0 | 12.03.07 12:43 |
| 3 | 00.0F.A3.10.07.6C | 69006 | 96 | 24583 | 15627 | 150 | 0 | 12.03.07 12:43 |
| 3 | 00.0F.A3.10.07.FB | 71749 | 92 | 24583 | 15627 | 150 | 0 | 12.03.07 12:43 |
| 3 | 00.0F.A3.10.09.5F | 71482 | 83 | 24583 | 15627 | 150 | 0 | 12.03.07 12:43 |
| 3 | 00.0F.A3.10.09.80 | 71000 | 40 | 24583 | 15627 | 150 | 0 | 12.03.07 12:43 |

The table includes the following information:
reference position identification (RID)
MAC addresses of the received stations
received field strengths of the radio transmitters RSSI (received signal strength indicator); 46560 means −46.560 dBm)
reference position in Cartesian metric coordinates (x, y, z; 24583 means 245.83 m), as well as
time of recording the measurement value.

The column PGS ("Percentage Seen") indicates how often this station has been seen on a percentage basis when recording the measurement values (i.e. PGS=90 means that the station has been measured on average in 9 out of 10 measurements).

In the table presented above, all the information associated with a reference position identification (RID) correspond to a reference measurement packet. This means that the above exemplary table comprises three reference measurement packets corresponding to three different geographical reference positions.

For localization, currently received radio transmitters with their respective associated received field strength (measurement packet) are compared to reference packets from the reference database in a matching phase. Reference packets having a small distance to the current measurement packet, i.e. many common radio transmitters and few differing received field strengths match the current measurement packet value well. The reference positions belonging to the well-matching reference packets are very likely and are entered into a position calculation phase. An estimated value for the current position result, for example, from a reference position associated with a reference packet most similar to the current measurement packet, or from an interpolation of several reference positions associated with similar reference packets.

A conventional distance formula frequently used in the matching phase $$acc = \sum_{n=1}^{N_{eq}} \Delta RSSI_n \qquad (1)$$

assumes that all radio transmitters can be received everywhere. Here, acc means the distance between current measurement packet and reference packet, and $N_{eq}$ a number of radio transmitters of which transmitter identifications previously recorded at the reference position are identical with transmitter identifications provided at the current position. Differences of RSSI values of radio transmitters of which transmitter identifications previously recorded at the reference position are identical to transmitter identifications provided at the current position, are referred to as $\Delta RSSI_n$ (n= 1, ..., $N_{eq}$). However, it is not at all costs the case that all radio transmitters are receivable everywhere. If a reference packet includes radio transmitters A, B and C, a current measurement packet the radio transmitters D, E, an (optimum) value of 0 results for the distance. Apparently, the reference packet matches perfectly, although no single radio transmitter between reference and current measurement packets matches.

Hence, in practice, calculation of the correspondence or distance can be modified, in that radio transmitters received in excess or too little in the current measurement packet compared to a reference measurement packet increase the distance by a fixed value resulting, for example, from a penalty function.

$$acc = \frac{EQW \cdot \sum_{n=1}^{N_{eq}} \Delta RSSI_n() + (1 - EQW) \cdot \left( \sum_{m=1}^{N_{nh}} M_{nh,m}() + \sum_{r=1}^{N_{HTM}} M_{htm,r}() \right)}{N_{eq} + N_{nh} + N_{htm}} \qquad (2)$$

Here, EQW means a weight between a 0 and 1 indicating how heavily the distance of measurement values or distance of signal strength values $\Sigma \Delta RSSI_n$ is to be evaluated compared to radio transmitters ($N_{nh}$) received in excess ($N_{htm}$) or too little at the current position. For every radio transmitter missing in the reference values but included in the currently measured measurement values, a penalty value $M_{htm,r}()$ (m=1, ..., $N_{htm}$) can be defined. Also, for every radio transmitter included in the reference values but missing in the currently measured measurement values, a penalty value $M_{nh,m}()$ ($m=1, \ldots, N_{nh}$) can be defined.

The handling of different radio transmitters between a reference packet and a current measurement packet might heavily influence localization accuracy. A radio transmitter missing in the reference measurement packet but appearing in the current measurement packet has either been newly erected or is a strong indication that this fingerprint does not match.

During moving measurements or during continuous detection of measurement packets with mobile terminal devices, it can happen that, for example by noise or shading effects, a signal of a radio transmitter unreliably receivable at a current position is not measurable, at least in some sections. Here, a moving measurement means a measurement where the mobile terminal device moves continuously for measurement purposes and no stop is made at a certain position for measurement purposes (as in reference measurements). For the matching phase, this can have the effect that for an unreliably receivable radio transmitter a penalty value would erroneously be calculated for determining a measure of correspondence at a measurement time where the same is currently not receivable, although the radio transmitter had, for example, still been receivable shortly before that. The penalty value will result in a poorer measure of correspondence between current measurement packet and reference packet and, hence, to a poorer position estimation compared to a field strength consideration of the unreliably receivable radio transmitter at the current measurement time in the matching phase.

SUMMARY

According to an embodiment, an apparatus for determining a correspondence of a position with a reference position, wherein radio signals of stationary radio transmitters are receivable at the position may have a determiner for determining an identification of a certain radio transmitter and for determining a signal characteristic of a radio signal of the certain radio transmitter at a first time, wherein the identification and the signal characteristic of the radio signal of the certain radio transmitter represent at least part of a measurement packet for the position; a processor for post-processing the measurement packet to acquire a post-processed measurement packet for the position, wherein the processor for post-processing is implemented to at least temporarily synthesize the signal characteristic of the certain radio transmitter, starting from the first time up to a second time after the first time, for which the identification of the certain radio transmitter cannot be determined, when the first time was the last time before the second time when the identification of the certain radio transmitter was determinable, and when a first time duration of more than or equal to 0.5 seconds lies between the first and second times; and a comparator for comparing the post-processed measurement packet with at least one previously determined reference measurement packet for the reference position to determine the correspondence.

According to another embodiment, a method for determining a correspondence of a position with a reference position, wherein radio signals of stationary radio transmitters are receivable at the position, may have the steps of determining an identification of a certain radio transmitter and determining a signal characteristic of a radio signal of the certain radio transmitter at a first time, wherein the identification and the signal characteristic of the radio signal of the certain radio transmitter represent at least part of a measurement packet for the position; post-processing the measurement packet to acquire a post-processed measurement packet for the position, wherein the processor for post-processing is implemented to at least temporarily synthesize the signal characteristic of the certain radio transmitter, starting from the first time up to a second time after the first time, for which the identification of the certain radio transmitter cannot be determined, when the first time was the last time before the second time when the identification of the certain radio transmitter was determinable, and when a time duration of more than or equal to 0.5 seconds lies between the first and second times; and comparing the post-processed measurement packet with at least one previously determined reference measurement packet for the reference position to determine the correspondence.

According to another embodiment, a computer program may have a program code for performing the method for determining a correspondence of a position with a reference position, wherein radio signals of stationary radio transmitters are receivable at the position, which may have the steps of determining an identification of a certain radio transmitter and determining a signal characteristic of a radio signal of the certain radio transmitter at a first time, wherein the identification and the signal characteristic of the radio signal of the certain radio transmitter represent at least part of a measurement packet for the position; post-processing the measurement packet to acquire a post-processed measurement packet for the position, wherein the processor for post-processing is implemented to at least temporarily synthesize the signal characteristic of the certain radio transmitter, starting from the first time up to a second time after the first time, for which the identification of the certain radio transmitter cannot be determined, when the first time was the last time before the second time when the identification of the certain radio transmitter was determinable, and when a time duration of more than or equal to 0.5 seconds lies between the first and second times; and comparing the post-processed measurement packet with at least one previously determined reference measurement packet for the reference position to determine the correspondence, when the computer program runs on a computer.

It is the knowledge of the present invention that results of correspondence calculations between measurement packets and reference packets at current measurement times can be improved in the matching phase, when during the measurement recording a signal characteristic last received from a radio transmitter is allocated to the certain radio transmitter for a predefined time period starting from the measurement time of the last received signal characteristic, if no more recent signal of the determined radio transmitter is received at the current position within this predefined time period, such that the certain radio transmitter or its signal characteristic can be considered in a determination of the correspondence between current measurement packet and a reference measurement packet within the predefined time period. In this case, no penalty value has to be erroneously determined for the certain radio transmitter. A more recent signal characteristic is allocated to the certain radio transmitter, if a more recent radio signal with the more recent signal characteristic is receivable from the certain radio transmitter at the current position within the predefined time period. According to embodiments of the present invention, the predefined time period is in the range of more than or equal to 0.5 seconds.

Therefore, embodiments of the present invention provide an apparatus for determining a correspondence of a position with a reference position, wherein radio signals from stationary radio transmitters are receivable at the position, having a means for determining an identification of a certain radio transmitter and for determining a signal characteristic of a radio signal of the certain radio transmitter at a first time, wherein the identification and the signal characteristic of the radio signal of the certain radio transmitter represent at least part of a measurement packet for the position, a means for post-processing the measurement packet to obtain a post-processed measurement packet for the position, wherein the means for post-processing is implemented to at least temporarily synthesize the signal characteristic of the certain radio transmitter, starting from the first time up to a second time after the first time, for which the identification of the certain radio transmitter cannot be determined, when the first time was the last time before the second time when the identification of the certain radio transmitter was determinable, and when a first time duration of more than or equal to 0.5 seconds lies between the first and second times, and a means for comparing the post-processed measurement packet with at least one previously determined reference measurement packet for a reference position to determine the correspondence.

The means for post-processing is adapted to allocate the signal characteristic of the certain radio transmitter received at the first time to the certain radio transmitter within the first time duration after the first time.

According to embodiments, the means for post-processing is further implemented to determine, based on a number of identifications of the certain radio transmitter determined within a second time period starting from the first time, a received frequency value (e.g. PGS value) indicating in how many received measurements within the time duration a radio signal of the certain radio transmitter could be received. The second time duration starting from the first time represents an upper limit for the first time duration. Together with the identification and the signal characteristic of the radio signal of the certain radio transmitter, the determined received frequency value can serve, at least as part of a reference packet for the position, which can be entered, for example, into a reference database.

The first and/or second time durations depend, for example, on a speed of motion and/or an environment of the mobile terminal device. If the mobile terminal device is used, for example, by a pedestrian within a building, the speed of motion will be relatively low, but the signal characteristics of the received measurement packet will still change relatively quickly during motion. In this case, the first and/or second time durations could be, for example, in a range of 1 second to 1 minute, advantageously in a range of 3 seconds. If the mobile terminal device is used by a pedestrian outdoors, the speed of motion will be relatively low and the signal characteristics of the received measurement packets will change relatively slowly during motion. In this case, the first and/or the second time durations can be, for example, in a range of 5 seconds to 2 minutes, advantageously in a range of 10 seconds. For applications with higher speeds of motion (e.g. bicycle, car, etc), the first and/or the second time durations have to be selected to be correspondingly shorter. The first and/or the second time durations could be conditioned, for example, directly on an estimated value for the speed of motion, such that they are, for example, inversely proportional to the estimated speed of motion.

In order to improve continuous localization where signal characteristics of radio transmitters within the environment are determined at a relatively high frequency (e.g. every 20 ms), according to embodiments, the means for post-processing comprises a means for low-pass filtering the determined signal characteristic of the radio signal of the determined radio transmitter to smooth a waveform of the determined signal characteristic.

According to embodiments, the signal characteristic of the radio signal of the certain radio transmitter is a signal characteristic related to the received field strength of the radio signal, such as a RSSI value, a received power spectrum, or a signal-to-noise power ratio of the radio signal at the position.

Further, according to embodiments, the determined radio transmitter is a WLAN base station. The apparatus for determining a correspondence of a position with a reference position is advantageously implemented in a mobile WLAN-enabled terminal device (e.g. mobile phone, PDA, laptop, etc.).

Further embodiments and implementations are the subject matter of the dependent claims.

By removing a radio transmitter from a measurement packet only after a certain time, without updating the signal characteristic, the matching phase can be made more robust against a merely short-term absence of otherwise receivable signals of the radio transmitter. A radio transmitter that cannot be permanently received at a current position can hence be considered better during the matching phase, which results in improved self-localization results of a mobile terminal device, based on radio fingerprints that are currently measured and that are stored in a reference database.

BRIEF DESCRIPTION OF THE DRAWINGS

Embodiments of the present invention will be detailed subsequently referring to the appended drawings, in which.

DETAILED DESCRIPTION OF THE INVENTION

Regarding the subsequent description, it should be noted that in the different embodiments, same or equal functional elements have the same reference numbers and hence the descriptions of these functional elements are interchangeable in the different subsequently illustrated embodiments.

Based on FIGS. 1 and 2 below, localization according to the fingerprinting method will briefly be described, in order to motivate the inventive concept, which will be discussed based on FIGS. 3 to 8.

Here, in particular, the fact that the increasing distribution of non-public WLAN stations has lead to significant over-coverage in many cities is taken into account. Frequently, 8 to 12 radio transmitters (access points) can be received at a single geographical position, wherein even a number of 30 receivable radio transmitters might be exceeded in inner-city regions (peaks on lively squares or areas of high living or population density).

For secure and exact localization, three to four radio transmitters are usually sufficient.

Figure 1:
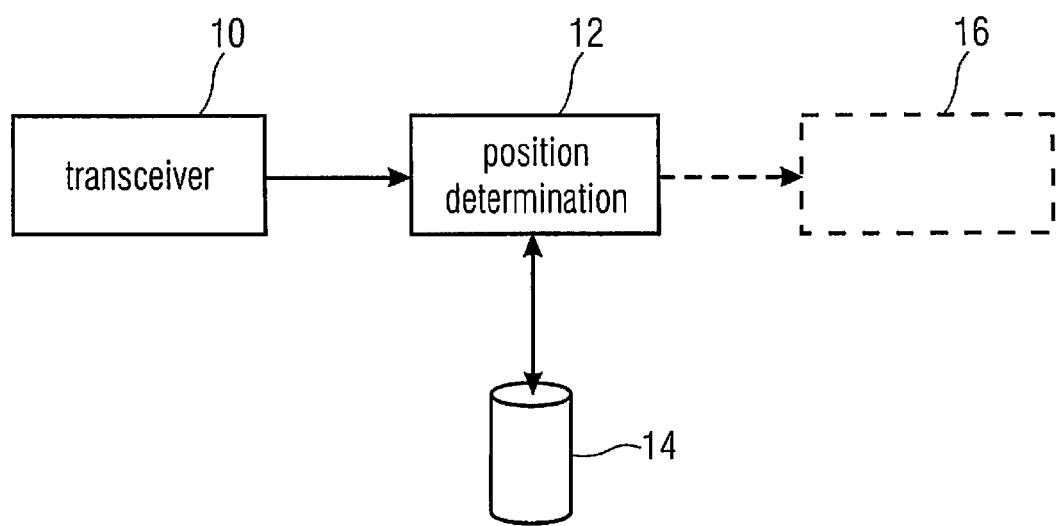
FIG. 1 is an embodiment of an apparatus for localizing terminal devices according to standard technology.

FIG. 1 illustrates how the localization of a mobile terminal device can be realized by means of fingerprinting (WLAN, GSM, Bluetooth, WMAX, etc.) in the public area as self-localization of every individual mobile terminal device. Thereby, no data transmission between radio transmitter and terminal device is needed, so that the connectivity of the mobile terminal device with other communication partners can basically be omitted. This is possible since the mobile terminal device calculates its own position by continuously (e.g. every 200 ms) measuring current signal characteristics (received measurement packets) of its environment and matching them to a local reference database (also with reference measurement packets).

For illustrating the method, FIG. 1 shows exemplarily a schematic representation of a mobile terminal device capable of self-localization. A receiving means 10 determines measurement packets having a number of radio transmitters within reach and their respective received field strengths. These measurement packets are then transmitted to a position determination unit 12 further having access to reference measurement packets recorded at previous reference times that can be stored in a reference database 14.

Thereby, the reference database 14 can be stored both locally within the mobile terminal device, and non-locally on an external memory location or device. In the latter case, the mobile terminal device obviously needs to have access to the reference data, for which at least a communication connection to the reference database 14 has to exist. The position determination unit 12 uses a localization algorithm in order to determine the current position of the terminal device based on a current measurement packet and the reference measurement packets. Therefore, first, in a matching phase, those reference measurement packets matching best with the current measurement packet, i.e. whose similarity is highest, are determined. Then, in a position calculation phase, based on the determined similar reference measurement packets and their associated geographical reference positions, the current geographical position of the terminal device is determined. When the current position is determined, the same can optionally be transmitted to an application module 16, for example for indicating the position in a digital city map, or for offering services having a direct causal connection with the determined position (so-called location based services).

Figure 2:
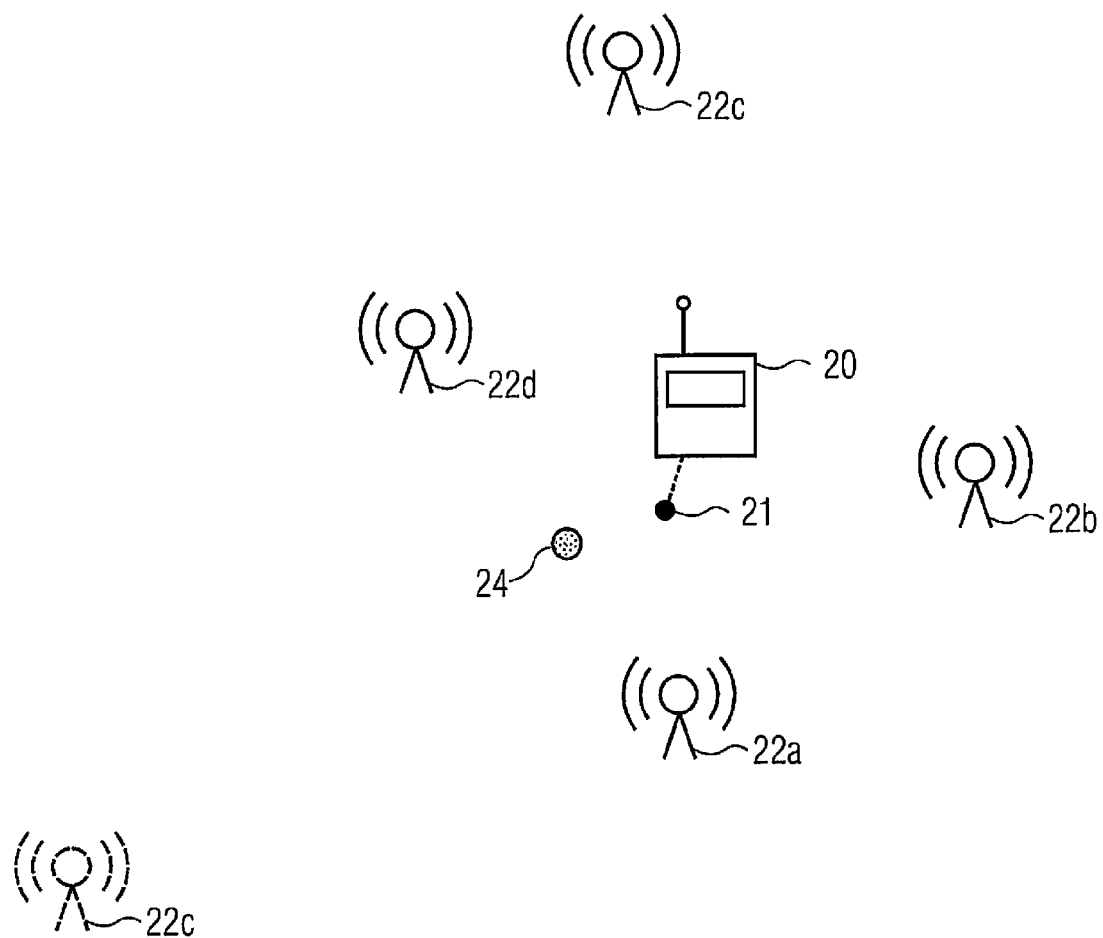
FIG. 2 is an example of an application of the method for localizing terminal devices.

FIG. 2 shows exemplarily an application scenario with a mobile terminal device 20 at a current position 21 and a plurality of communication partners or radio transmitters 22a-22e that are in an environment of the mobile terminal device 20. As environmental information, the mobile terminal device 20 can determine, for example, measurement packets comprising the unique identification numbers of radio transmitters 22a-22e and the received field strengths associated with the respective radio transmitters at the current position 21. A certain radio transmitter 22e is at a largest distance to the mobile terminal device 20, such that the same can be received by the mobile terminal device 20 at the current position 21 at certain times and at other times not. In an urban area, for example, short-term shading by pedestrians or cars can take place. Additionally, a change of air quality, in particular air humidity, can have the effect that the certain radio transmitter 22e is received at times and at other times not.

It is very likely that the radio transmitter 22e unreliably receivable at the current position 21 is listed in a reference packet corresponding to a reference position 24 close to the current position 21, but closer to the radio transmitter 22a, or that has been determined across a longer measurement time period (e.g. 6 s). Hence, considering the radio transmitter 22e unreliably receivable at the current position 21 of the mobile terminal device 20 in the matching phase is advantageous, so as not to erroneously reject the actually similar reference measurement packet according to the reference position 24 close to the current position 21 as badly matching, and hence to reach a bad localization result.

It is the aim of embodiments of the present invention, which will be discussed in more detail below, to account for this problem.

Figure 3:
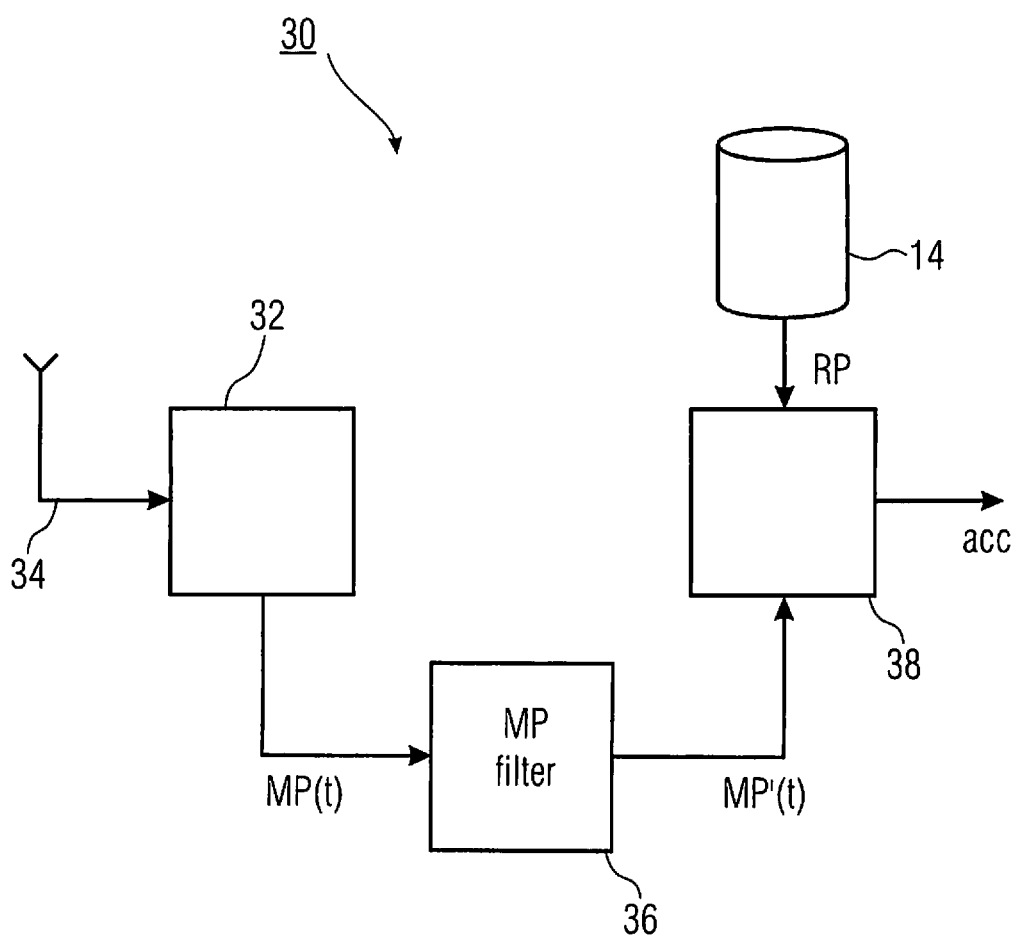
FIG. 3 is a schematic block diagram of an apparatus for determining a correspondence of a current position with a reference position according to an embodiment of the present invention.
Figure 4:
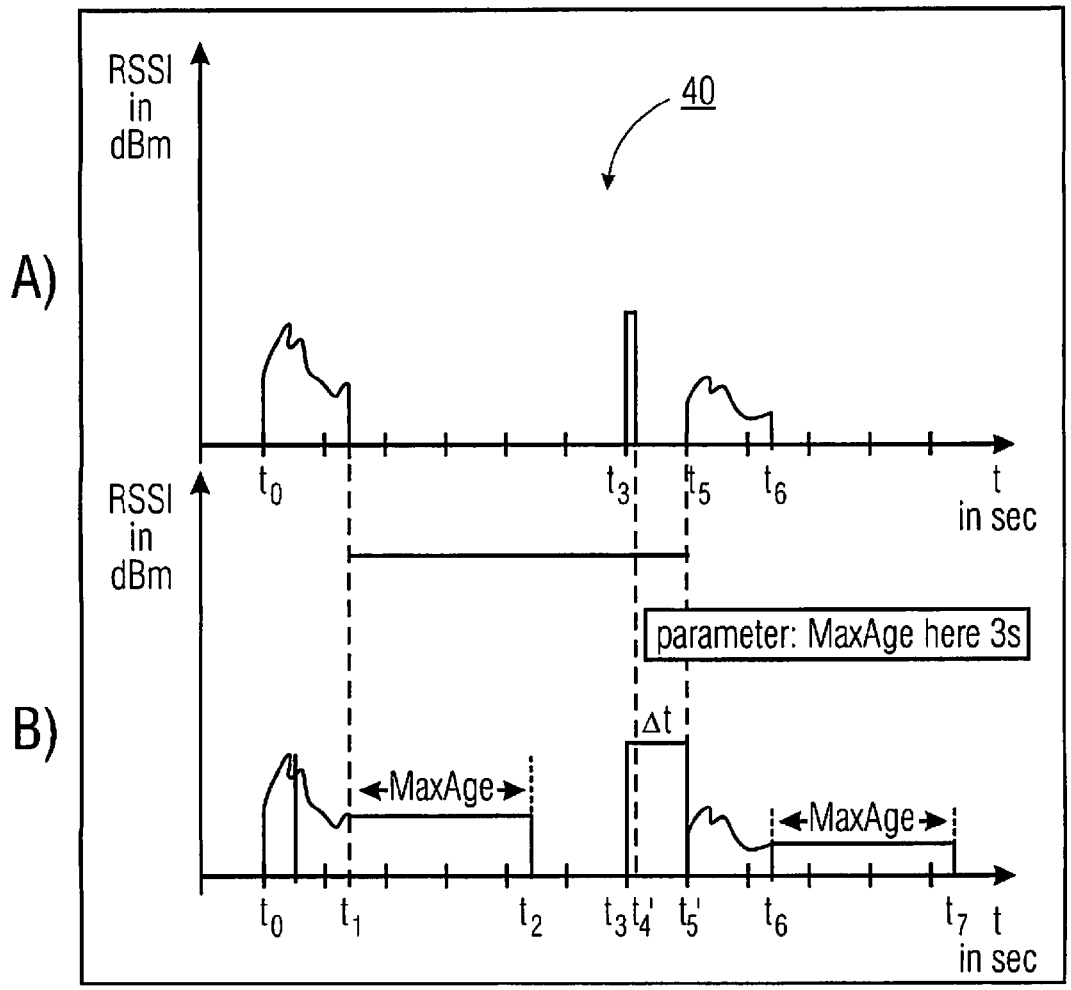
FIG. 4A is a non-post-processed waveform of radio signal of a certain radio transmitter at a current position.
FIG. 4B is a post-processed waveform of the non-post-processed waveform according to FIG. 4A according to an embodiment of the present invention.

FIG. 3 shows schematically an apparatus 30 for determining a correspondence of the current position 21 with the reference position 24, according to an embodiment of the present invention.

The apparatus 30 comprises a means 32 for determining and identification of the certain radio transmitter 22e and for determining a signal characteristic of a radio signal of the certain radio transmitter 22e at a first time $t_1$. For that, the means 32 for determining is coupled, for example, with an antenna 34 for receiving radio signals. The identification and the signal characteristic of the radio signal of the certain radio transmitter 22e represent at least part of a measurement packet MP $(t_1)$ for the current position 21 at the first time $t_1$.

Further, the apparatus 30 comprises a means 36 for post-processing the determined measurement packet MP $(t_1)$ to obtain a post-processed measurement packet WP'$(t_1)$ for the current position 21, wherein the means 36 for post-processing is implemented to synthesize the signal characteristic of the certain radio transmitter 22e (at least temporarily), starting from the first time $t_1$ up to a second time $t_2$ after the first time $t_1$, for which the identification of the certain radio transmitter 22e cannot be determined, when the first time $t_1$ was the last time before the second time $t_2$ when the identification of the certain radio transmitter 22e was determinable, and when a time duration $\Delta t=(t_2-t_1)$ of more than or equal to 0.5 seconds lies between the first and second times $t_1, t_2$. The first time $t_1$ is to be interpreted as measurement time when the measurement packet MP $(t_1)$ is determined. The second time $t_2$ can but does not have to be the measurement time. In a WLAN implementation, successive measurement times are 200 ms apart, so that in such an embodiment the signal characteristic synthesis starts (e.g. retroactively from $t_1$) when a radio transmitter could not be received since $t_1$ for a time duration $\Delta t \geq 0.5$ s. The time duration $\Delta t$ is limited by a maximum value, which can be referred to, for example, as "MaxAge". The maximum time duration MaxAge depends, for example, on a speed of motion v and/or the environment of the mobile terminal device. If the mobile terminal device is used, for example, by a pedestrian within a building, the time period MaxAge can be, for example, in the range of 1 second to 1 minute, advantageously in a range of 3 seconds. If the mobile terminal device is used by a pedestrian outdoors, the time duration MaxAge can be in a range of 5 seconds to 2 minutes, advantageously in a range of 10 seconds. In applications with higher speeds of motion (e.g. bicycle, car, etc.), the time duration MaxAge is to be selected correspondingly shorter. The time duration MaxAge can, for example, be adjustable, so that the same is set, for example, inversely proportional to the estimated speed of motion, i.e. MaxAge~1v.

On the output side, the means 36 for post-processing is coupled with a means 38 for comparing the post-processed measurement packet MP'(t$_1$) with at least one previously determined reference measurement packet RP for a reference position to determine the correspondence between current position and reference position. For this, the at least one previously determined reference measurement packet RP is taken, for example, from a reference database 14. The correspondence or the measure of correspondence corresponds to a distance function between the signal characteristics of the radio transmitters of the post-processed measurement packet MP' and the signal characteristics of the radio transmitters of the reference measurement packet RP.

In other words, the means 32 serves for determining a current radio signal of the determined radio transmitter 22e at the current position 21 at the time t$_1$, wherein a transmitter identification of the certain radio transmitter 22e is extractable from the received radio signal. In order for the radio signal of the determined radio transmitter 22e to be receivable at the current position 21, it has a signal level at the time t$_1$, which is physically larger than 0 and lies above a sensitivity level of the means 32 for determining.

The means 36 for post-processing allocates the signal level of the radio signal of the certain radio transmitter 22e received at the first time t$_1$ to the certain radio transmitter 22e maximally for the time duration MaxAge, if no more recent radio signal of the certain radio transmitter 22e is received at the current position 21 within this time duration MaxAge, such that the certain radio transmitter 22e or its signal characteristic determined at a time t$_1$ can be considered in determining the correspondence in the means 38 for comparing within the time duration t$_1$+Δt (Δt≤MaxAge).

If a more recent radio signal is received at the current position 21 with the identification of the certain radio transmitter 22e within the time duration t$_1$+MaxAge, the means 36 for post-processing allocates a more recent signal characteristic of the more recent radio signal, such as a more recent received signal level, to the certain radio transmitter 22e.

According to embodiments, the apparatus 30 is in a mobile terminal device 20, such as a mobile WLAN-capable client. The stationary radio transmitters 22a-e are, for example, WLAN base stations receivable at least in sections at the current position 21 of the WLAN-capable client 20. In this case, the identification of the WLAN base stations 22a-e respectively consists of a MAC address of the respective WLAN base station.

As has already been described above, a measurement packet MP recorded at the current position 21 of the WLAN-capable client 20 generally comprises a plurality of MAC addresses of WLAN base stations and associated RSSI values. In continuous localization, where the WLAN-capable client 20 is moved in an environment, RSSI values from WLAN base stations 22e within the environment of the client 20, i.e. measurement packets, are determined with a relatively high frequency, e.g. 5 times per second. This means the MAC addresses of stationary radio transmitters as well as their RSSI values received by the client 20 are combined in a measurement packet MP(t), e.g. every 200 ms, wherein t represents a measurement time.

Since continuous localization operates with a relatively small time window per measurement, it can happen that a measurement signal of a radio transmitter 22e, which is unreliable for the current position 21, fails to appear within such a short time window, wherein the respective radio transmitter 22e was just not receivable at the position 21 in this time interval, but probably in a previous measurement time interval. Without post-processing a measurement packet MP(t), this would have the effect that this unreliable radio transmitter 22e would not be considered at all or erroneously at the current measurement time t by block 38, although, for example, a signal of this certain radio transmitter 22e had been receivable shortly beforehand.

A it were, the means 36 for post-processing prolongs the occurrence of a radio transmitter in a (post-processed) measurement packet by maximally the predefined time duration MaxAge, which lies within a range of more than or equal to 0.5 seconds. Assuming the signal of the certain radio transmitter 22e is interrupted at the time t$_1$, i.e. it is no longer receivable at the current position 21 from then on. Then, according to embodiments, the received signal level allocated to the certain radio transmitter 22e at the time t$_1$, is synthesized or maintained constant for maximally the predefined time duration MaxAge for the certain radio transmitter 22e starting from the time t$_1$, whereby possible temporary dropouts of the certain radio transmitter 22e at the current position 21 can be bridged. This situation is shown exemplarily in FIG. 4.

FIG. 4A shows a non-post-processed waveform 40 of the radio signal of the certain radio transmitter 22e at the current position 21. The certain radio transmitter 22e is, as has already been described, a radio transmitter unreliably receivable at the current position 21, such that the received waveform 200 is fragmentary. At a first time t$_1$, the signal of the certain radio transmitter 22e received by the terminal device 20 at the position 21 is interrupted. This means up to the time t$_1$, a transmitter identification, e.g. MAC address of the radio transmitter 22e can be determined, but not from the time t$_1$ onwards. The means 36 for post-processing is adapted to allocate, to the certain radio transmitter 22e, its last receivable signal level for a maximum time duration MaxAge. Thereby, the signal interruption illustrated in FIG. 4A at the time t$_1$ can be delayed for the means 38 for comparing, practically by the time duration MaxAge up to the time t$_2$, as illustrated in FIG. 4B. Only then the certain radio transmitter 22e and its latest receivable signal level will also be removed from the post-processed measurement packets.

At the time t$_3$, the certain radio transmitter 22e can again temporarily be received by the mobile terminal device 20 up to the time t$_4$, before the communication between a certain radio transmitter 22e and the mobile terminal device 20 is interrupted again. As has just been described, the means 36 for post-processing also allocates the latest signal level received at the time t$_4$ after the dropout to the certain radio transmitter 22e. At the time t$_5$, communication between the certain radio transmitter 22e and the mobile terminal device 20 starts again, such that from the time t$_5$ onwards the actually received signal level values can be allocated again to the radio transmitter 22e, up to a time t$_6$, where communication is interrupted again. From then on, the latest received signal level of the time t$_6$ will again be allocated to the radio transmitter for the maximum time duration MaxAge (e.g. 3 seconds), until the certain radio transmitter 22e is finally removed from the (post-processed) measurement packet after expiration of the maximum time duration t$_6$+MaxAge, and hence no signal level value of the radio transmitter 22e is available for the means 38 for comparing.

Figure 5:
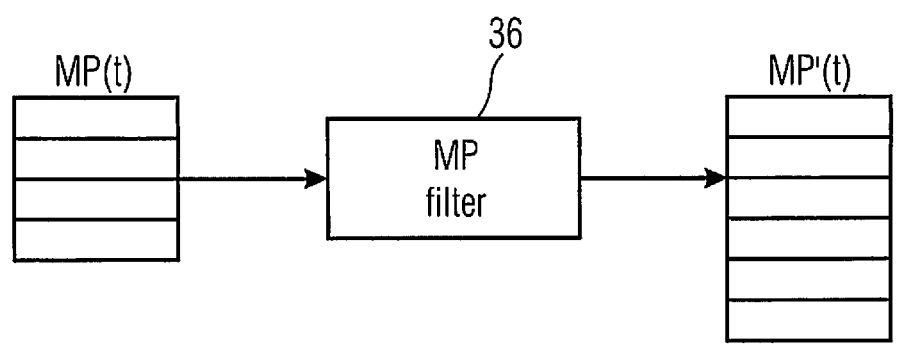
FIG. 5 is a schematic illustration of a measurement packet and a measurement packet post-processed by the means for post-processing.

The means 36 for post-processing can hence have the effect that a measurement packet MP'(t) post-processed at the time t has more entries (i.e. MAC addresses and associated RSSI values) than a measurement packet MP(t) actually determined by the means 32 at the time t, as shown exemplarily in FIG. 5.

Figure 6:
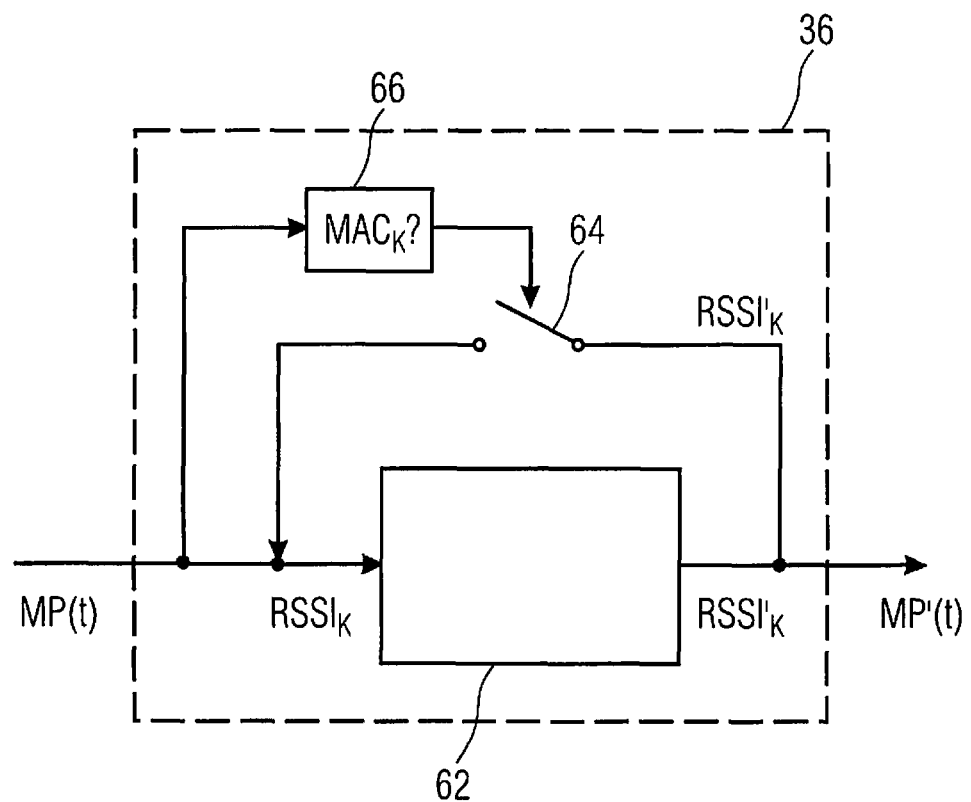
FIG. 6 is a schematic illustration of a means for prost-processing according to an embodiment of the present invention.

A possible structure of the means 36 for post-processing will be described in more detail below based on FIG. 6.

On the input side, a measurement packet MP(t) including K MAC addresses $MAC_k$ and associated RSSI values $RSSI_k$ (k=1, 2, ..., K) measured at the current time t is applied to the means 36 for post-processing. Each of the K RSSI values $RSSI_k$ is sent through a MaxAge control block 62 in order to obtain post-processed RSSI values $RSSI'_l$ (l=1, 2, ..., L; L≥K) on the output side. The output of block 62 can be coupled back to the input via switch 64. Thereby, the switch is controlled via block 66 connected to the input of means 36 for post-processing. At every measurement time t, block 66 checks whether an MAC address of the k-th radio transmitter determined at the previous measurement time (e.g. t−1) can also be determined at the measurement time t. If this is the case, the switch 64 will remain open, such that back coupling from the output to the input of block 62 remains deactivated whereby the k-th output of block 62 depends on the currently received k-th input of block 62.

If block 66 determines, for example, that the MAC address of the k-th radio transmitter is no longer determinable at the time t in comparison with the time t−1 (e.g. based on a received signal level that is too low at the time t), switch 64 will be closed for coupling the k-th output of block 62 back to the k-th input, and for thereby keeping the RSSI value $RSSI_k$ constant for maximally the predetermined time duration MaxAge. If, at the time t, other radio transmitters are received as at the time t−1, more RSSI values can be tapped on the output side than on the input side by coupling back RSSI values of no longer receivable radio transmitters.

Block 62 can be implemented in various ways. Block 62 can, for example, merely have one delay element for delaying a RSSI value by one clock period on its way from the input to the output. According to other embodiments, block 62 can also comprise a more complex filter, such as a digital low-pass filter as will be described in more detail below.

Partially, WLAN signals show a very strong noise behavior in their waveforms. Reasons for this are, for example, measurement inaccuracy, spurious influences of other radio techniques in the frequency domain between 2.4 GHz and 2.483 GHz, or multipath propagation of WLAN signals. The influence of multipath propagation is significantly higher in a moving measurement as compared to a measurement at a stationary location. WLAN signals that are theoretically to be measured only with a relatively low field strength show a relatively unreliable behavior with regard to "measurable" or "non-measurable". This has a negative influence on the matching phase, where penalty values can be calculated for base stations received too little in comparison with a reference point.

Figure 7A:
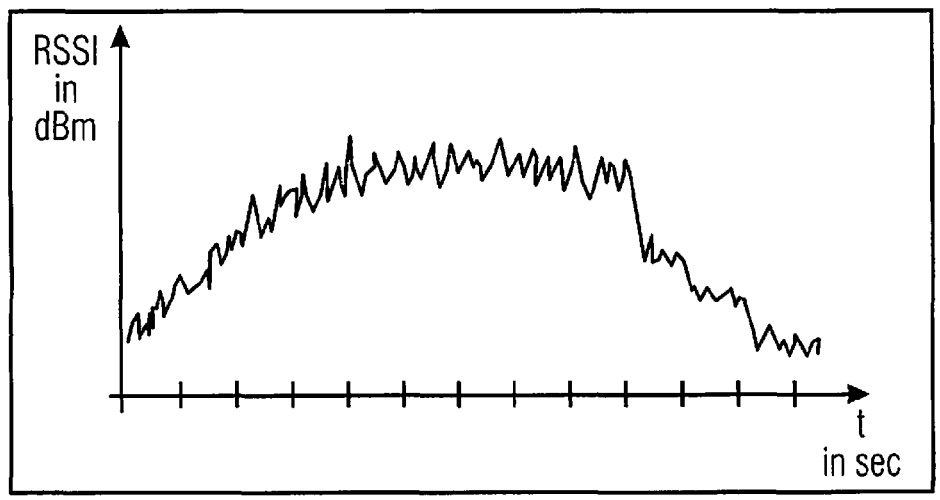
FIG. 7A is a waveform of received signal strength values in a moving measurement.

In a continuous, i.e. moving localization, signal field strength values are determined from all base stations in the environment at a relatively high frequency (e.g. 5× per second), which can result in a waveform of the signal strength values of a base station as schematically indicated in FIG. 7A. The variations in the measured signal can be up to 15 dB.

Figure 7B:
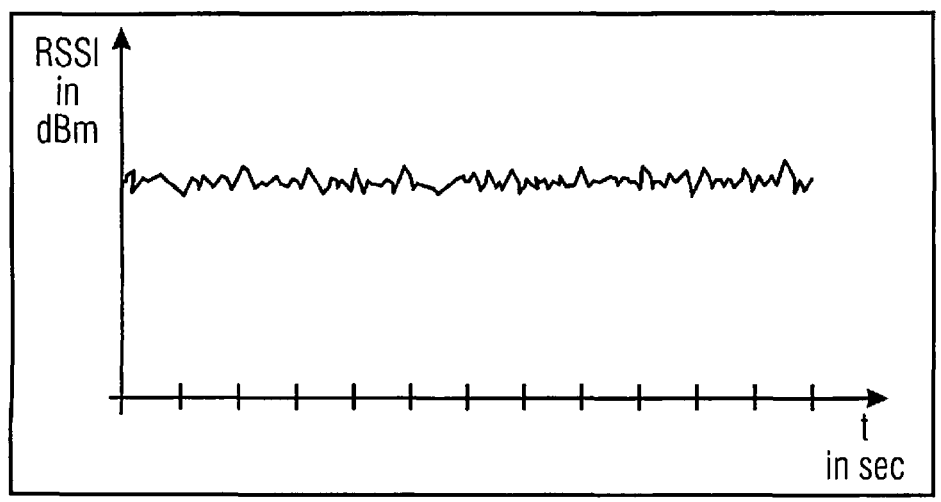
FIG. 7B is a waveform of received signal strength values in a non-moving reference measurement.

In comparison, FIG. 7B illustrates a waveform of a non-moving measurement showing, on the one hand, less noise behavior, and showing, on the other hand, that simple averaging across measurable signal values of the base stations can lead to a relatively safe result for the actual RSSI value (e.g. averaging across 50 individual measurements). Non-moving measurements take place, for example, during a training phase for generating the reference database 14, where a stop is made at reference positions to determine reference packets at this reference position.

Figure 8:
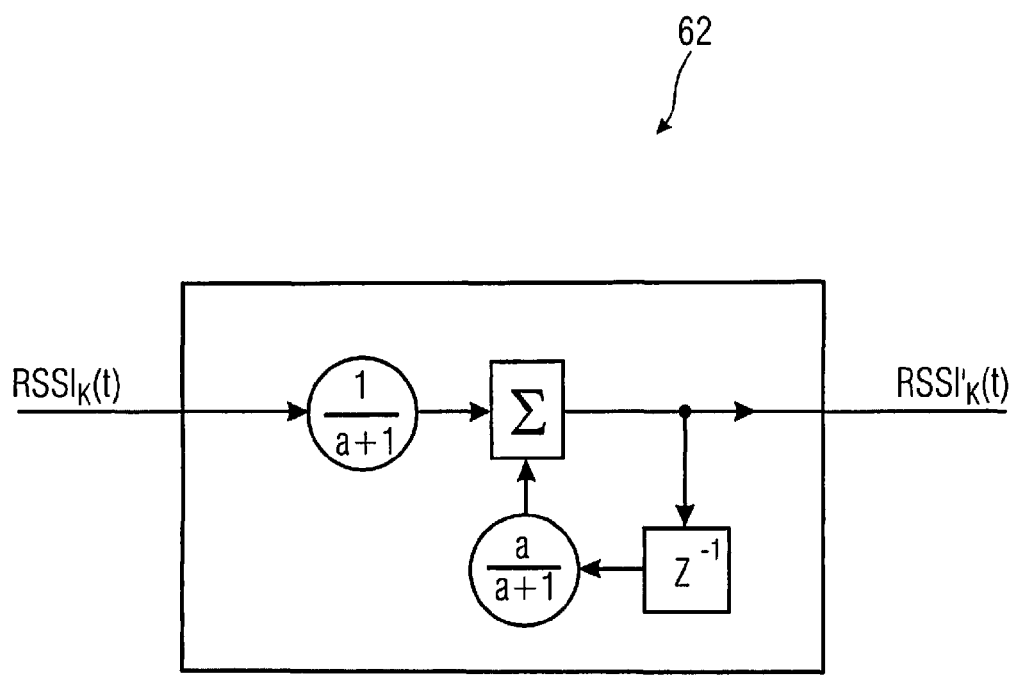
FIG. 8 is an exemplary low-pass filter.

For reducing the noise component in continuous measurement, a digital low-pass filter for filtering the K RSSI values of a current measurement packet can be used in block 62. An exemplarily implementation of an inventive low-pass filter is shown in FIG. 8.

Figure 9:
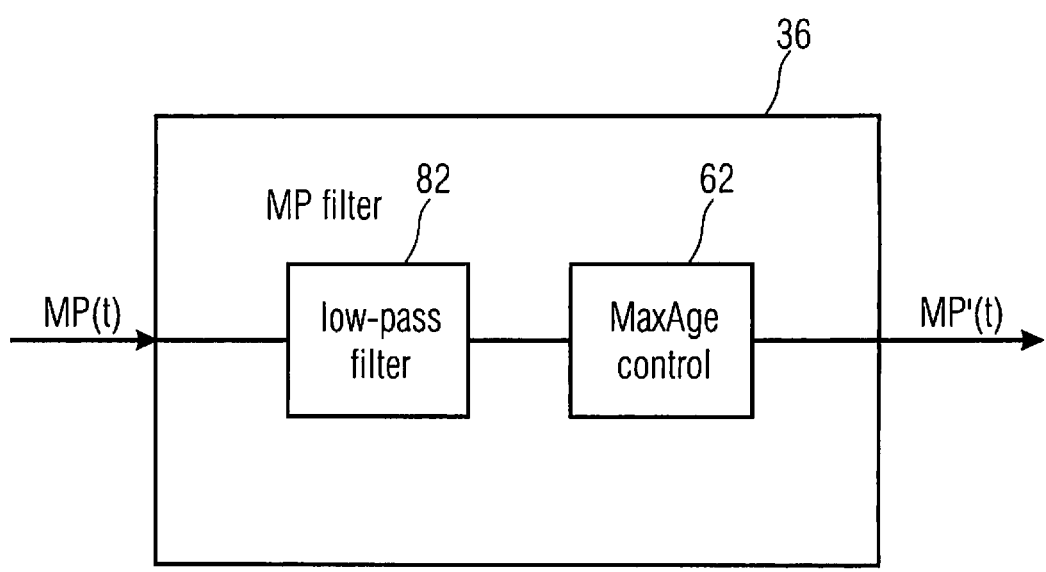
FIG. 9 is a combination of digital low-pass filter and Max-Age control according to an embodiment of the present invention.

The digital low-pass filter 82 can be a first order IIR filter (IIR=infinite impulse response). Thereby, the input signal $RSSI_k(t)$ is weighted with a factor $1/(a+1)$. The output signal is delayed by one clock period by means of a delay member, weighted with a factor $a/(a+1)$ and added up with the weighted input to obtain a current output signal $RSSI'_k(t)$. The transfer function of the digital low-pass filter shown in FIG. 8 is $H(z)=1/(a+1-az^{-1})$. The parameter $a/(a+1)$ can be considered as a so-called history weight factor that weighs the last calculated value $RSSI'_k(t-1)$ in comparison with the current value $RSSI_k(t)$. This value should possibly be adapted to the used sample interval. According to embodiments, a=3. As shown schematically in FIG. 9, the digital low-pass filter 82 can be combined together with the MaxAge control block 62. In this case, incoming RSSI values $RSSI_k$ are filtered when the identification of the respective allocated radio transmitter k can respectively be determined in successive received measurements. Otherwise, previous RSSI output values of the low-pass filter 82 are used as output signal of the means 36 for currently non-receivable certain radio transmitters for the maximum time duration MaxAge. Thereby, the previous RSSI output value of the low-pass filter 82 corresponds to the low-pass filtered RSSI output value at the last received time of the identification of the respective certain radio transmitter.

When generating a reference measurement packet during calibration, the average RSSI value for an access point or a base station is formed from the measured individual values within a certain time window (e.g. 6 s). Here, it is not significant as to how reliably values from this base station were receivable.

However, continuous localization does not operate with a time window of comparable large size as in generating a reference packet. This can have the effect that a penalty value would erroneously be calculated during matching when a measurable signal of an unreliable access point 22e for the current position fails to appear. In order to counteract this already during recording of measurement values, the access point 22e is only removed from the measurement packet to be processed by the means 36 for post-processing after expiration of a certain time MaxAge without any update of the RSSI value. Thereby, a channel or signal coherence time of the continuous localization is practically artificially adapted to the channel or signal coherency time of the calibration. In other words, a MaxAge value of, for example, MaxAge=3 s means that a base station is removed from the measurement packet to be processed after the expiration of 3 s without any update of the RSSI value at the latest. In other words, even when a signal of a certain radio transmitter can no longer be received, the certain radio transmitter remains visible in the (post-processed) measurement packet MP' with its last RSSI value for a maximum of 3 more seconds, as long as no more current signal of the certain radio transmitter is received during this time.

In summary, the present invention allows signal processing of measurement packets for a subsequent matching phase with reference measurement packets RP, such that a continuous self-localization based on radio fingerprints of the mobile terminal device can be enabled or improved. This means that reference measurement packets determined with calibration boxes in an idle state across a longer time window (e.g. 6 to 10 seconds) can be compared to moving measurements, for example of the mobile terminal device, where it is to be assumed that each measurement has been performed at a slightly different position due to movement of the mobile terminal device.

Embodiments of the present invention allow determining a PGS value for a certain radio transmitter within a time window $\Delta_t$ limited by the MaxAge value. Therefore, according to one embodiment, the apparatus 30 further comprises a means for determining a received frequency value based on a number of identifications of the certain radio transmitter 22e determined within the time duration MaxAge, indicating in how many received measurements within the time duration MaxAge a radio signal of a certain radio transmitter could be received.

Further, according to one embodiment, the apparatus is implemented to combine the determined received frequency value together with the identification and the signal characteristic of the radio signal of the certain radio transmitter, at least as part of a reference packet for the current position 21, and to possibly supply the same to the reference database update. Although in such a determination of a PGS value either only a relatively short time window MaxAge is considered, or, in a longer time window MaxAge, there is the danger that the current location 21 could change too much during the measurement, it has shown to be advantageous to be able to generate reference points for a reference data base 14 potentially also from the moving measurements. Estimating the PSG values determined in this manner can advantageously be used in a matching phase with PGS values of reference points from the reference database 14.

In summary, it is noted that depending on the circumstances, the inventive concept can also be implemented in software. The implementation can be made on a digital memory medium, in particular a disc, a CD or a DVD having an electronically readable control signal that can cooperate with a programmable computer system and/or microcontroller such that the respective method is performed. Therefore, generally, the invention also consists of a computer program product having a program code stored on a machine-readable carrier performing the inventive method when the computer program product runs on a computer and/or microcontroller. In other words, the invention can be realized as a computer program having a program code for performing the methods when the computer program runs on a computer and/or microcontroller.

While this invention has been described in terms of several embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations and equivalents as fall within the true spirit and scope of the present invention.

The invention claimed is:

1. An apparatus for determining a correspondence of a position with a reference position, wherein radio signals of stationary radio transmitters are receivable at the position, comprising:
    a determiner for determining an identification of a certain radio transmitter and for determining a signal characteristic of a radio signal of the certain radio transmitter at a first time, wherein the identification and the signal characteristic of the radio signal of the certain radio transmitter represent at least part of a measurement packet for the position;
    a processor for post-processing the measurement packet to acquire a post-processed measurement packet for the position, wherein the processor for post-processing is implemented to at least temporarily synthesize the signal characteristic of the certain radio transmitter, starting from the first time up to a second time after the first time, for which the identification of the certain radio transmitter cannot be determined, when the first time was the last time before the second time when the identification of the certain radio transmitter was determinable, and when a first time duration of more than or equal to 0.5 seconds lies between the first and second times; and
    a comparator for comparing the post-processed measurement packet with at least one previously determined reference measurement packet for the reference position to determine the correspondence.

2. The apparatus according to claim 1, wherein the processor for post-processing is adapted to allocate the signal characteristic of the certain radio transmitter received at a first time to the certain radio transmitter within the first time duration after the first time.

3. The apparatus according to claim 1, further comprising a determiner for determining a received a frequency value, based on a number of identifications of the certain radio transmitter determined within a second time duration, which is an upper limit of the first time duration, indicating in how many received measurements within the second period a radio signal of the certain radio transmitter could be received.

4. The apparatus according to claim 3 implemented to combine the determined received frequency value together with the identification and the signal characteristic of the radio signal of the certain radio transmitter as at least part of a reference packet for the position.

5. The apparatus according to claim 1, wherein the processor for post-processing comprises a filter for digital low-pass filtering the determined signal characteristic of the radio signal of the certain radio transmitter to smooth a waveform of the determined signal characteristic.

6. The apparatus according to claim 5, wherein the filter for digital low-pass filtering comprises a first order IIR filter.

7. The apparatus according to claim 1, wherein the signal characteristic of the radio signal of the certain radio transmitter comprises an electromagnetic signal characteristic of the radio signal.

8. The apparatus according to claim 1, wherein the determiner for determining is implemented to provide signal characteristics of the radio signal at the position that are related to a received field strength.

9. The apparatus according to claim 8, wherein the determiner for determining is implemented to provide an RSSI value, a received power spectrum or a signal-to-noise ratio of the radio signal of the certain radio transmitter at the position.

10. The apparatus according to claim 1, wherein the certain radio transmitter is a WLAN base station.

11. The apparatus according to claim 10, wherein the identification of the certain radio transmitter is an MAC address of the certain radio transmitter.

12. The apparatus according to claim 1, implemented in a mobile WLAN-capable terminal device.

13. A method for determining a correspondence of a position with a reference position, wherein radio signals of stationary radio transmitters are receivable at the position, comprising:
    determining an identification of a certain radio transmitter and determining a signal characteristic of a radio signal of the certain radio transmitter at a first time, wherein the identification and the signal characteristic of the radio signal of the certain radio transmitter represent at least part of a measurement packet for the position;

post-processing the measurement packet to acquire a post-processed measurement packet for the position, wherein the processor for post-processing is implemented to at least temporarily synthesize the signal characteristic of the certain radio transmitter, starting from the first time up to a second time after the first time, for which the identification of the certain radio transmitter cannot be determined, when the first time was the last time before the second time when the identification of the certain radio transmitter was determinable, and when a time duration of more than or equal to 0.5 seconds lies between the first and second times; and comparing the post-processed measurement packet with at least one previously determined reference measurement packet for the reference position to determine the correspondence.

14. A computer program comprising a program code for performing the method for determining a correspondence of a position with a reference position, wherein radio signals of stationary radio transmitters are receivable at the position, comprising:

determining an identification of a certain radio transmitter and determining a signal characteristic of a radio signal of the certain radio transmitter at a first time, wherein the identification and the signal characteristic of the radio signal of the certain radio transmitter represent at least part of a measurement packet for the position;

post-processing the measurement packet to acquire a post-processed measurement packet for the position, wherein the processor for post-processing is implemented to at least temporarily synthesize the signal characteristic of the certain radio transmitter, starting from the first time up to a second time after the first time, for which the identification of the certain radio transmitter cannot be determined, when the first time was the last time before the second time when the identification of the certain radio transmitter was determinable, and when a time duration of more than or equal to 0.5 seconds lies between the first and second times; and comparing the post-processed measurement packet with at least one previously determined reference measurement packet for the reference position to determine the correspondence, when the computer program runs on a computer.

* * * * *